April 27, 1954
F. M. YOUNG
2,676,819
RADIATOR COUPLING AND METHOD OF
FORMING AND BONDING THE SAME
Filed July 24, 1950
2 Sheets-Sheet 1
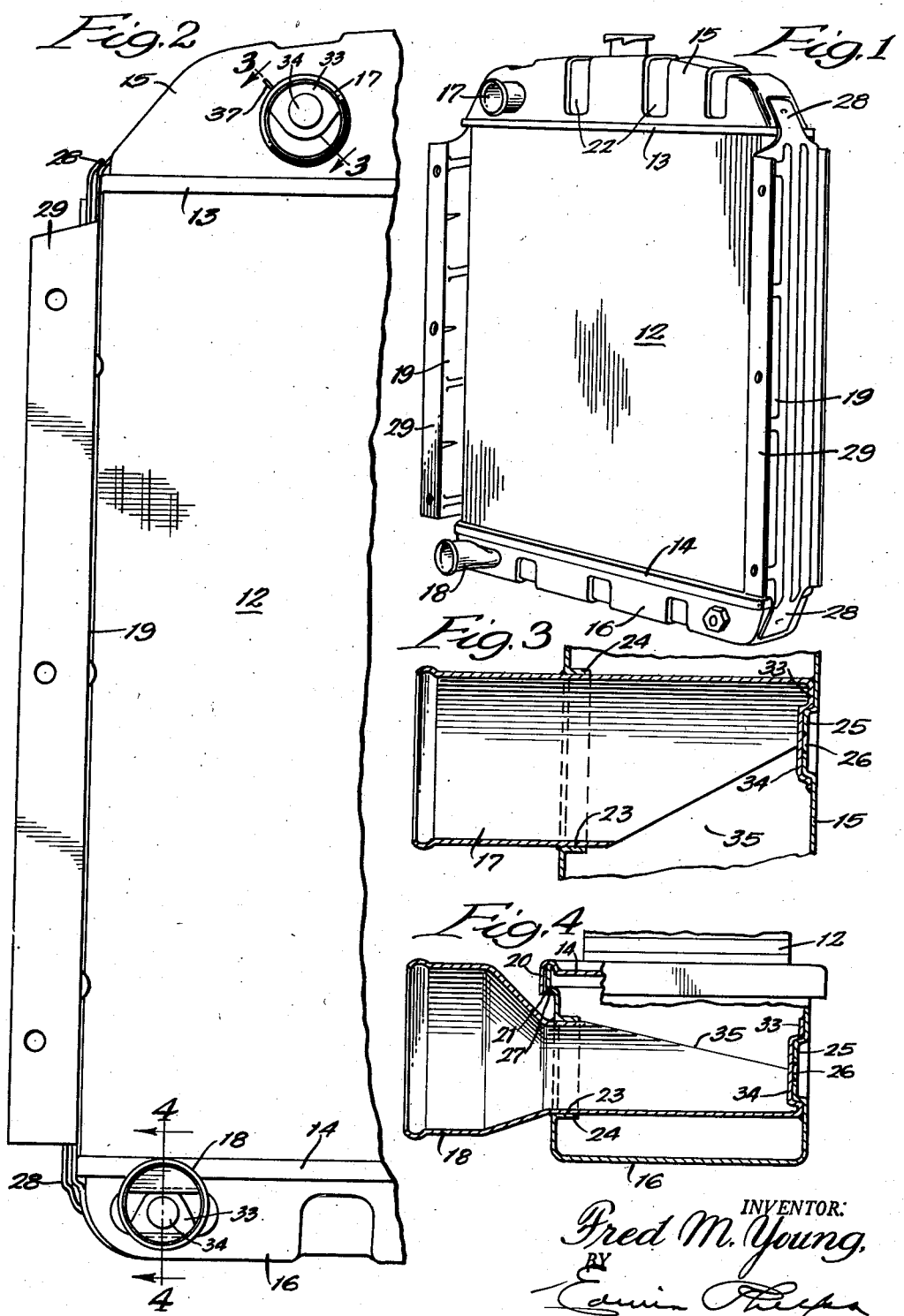
INVENTOR:
Fred M. Young,
BY
ATTORNEY.

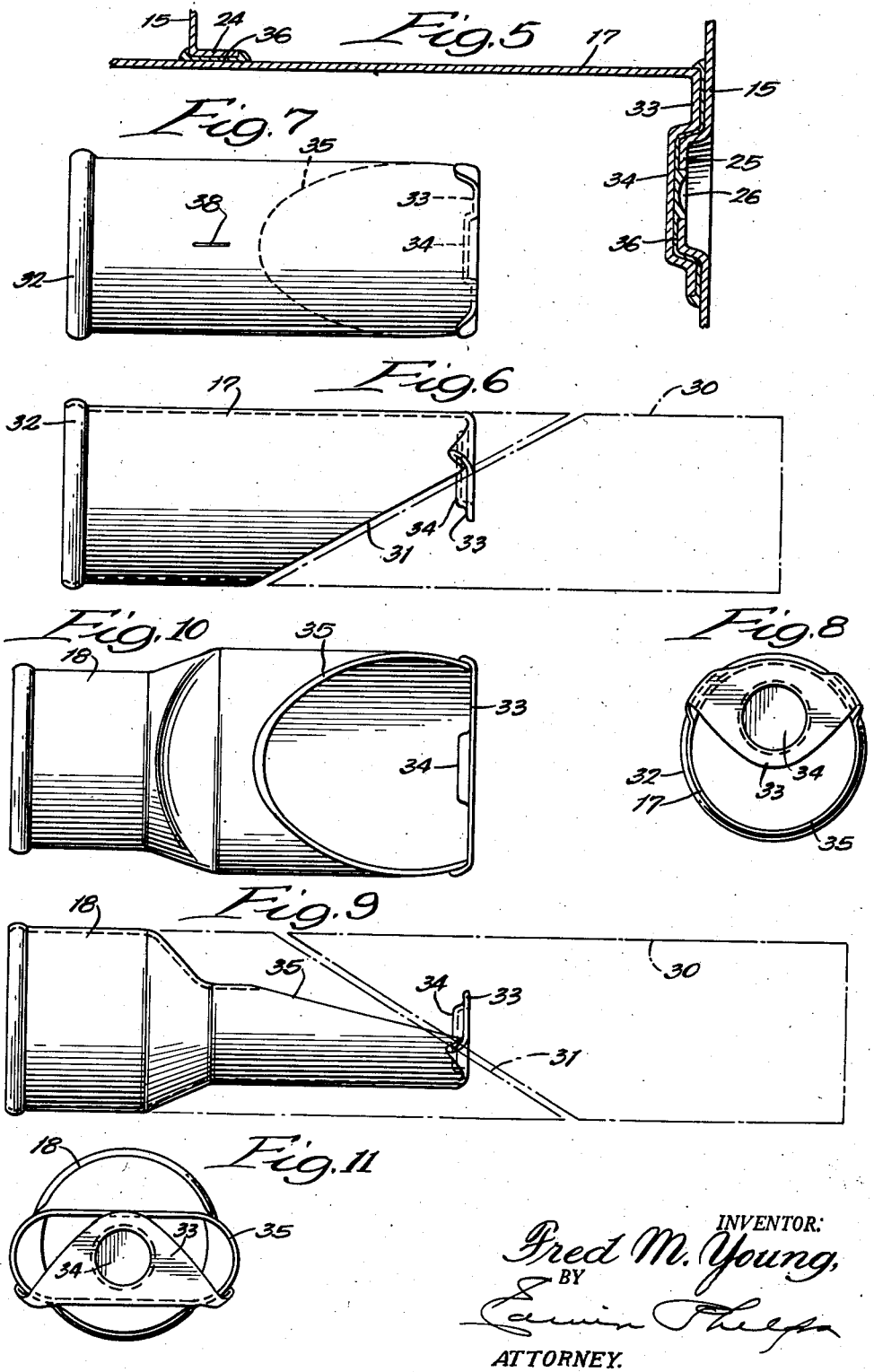

Patented Apr. 27, 1954

2,676,819

UNITED STATES PATENT OFFICE 2,676,819

RADIATOR COUPLING AND METHOD OF FORMING AND BONDING THE SAME

Fred M. Young, Racine, Wis., assignor to Young Radiator Company, Racine, Wis., a corporation of Wisconsin Application July 24, 1950, Serial No. 175,616

4 Claims. (Cl. 285—5)

This invention relates to heat exchange devices especially of the type to be used for cooling the jackets of gas, gasoline, or diesel engines or other heat-generating structures and very particularly where these engines are used on automotive equipment.

The core for such heat exchange devices, commonly called "radiators," to be efficient has to be formed of very light material. Generally these cores comprise a battery of thin copper tubes, mounting thin copper fins, the tubes being connected between manifolds designated as "headers" or tanks. The tanks have connections whereto conduits are attached which convey the coolant between the radiator and the engine. More recently, in order to reduce costs and keep the radiators as light as possible, these tanks are in the form of sheet metal stampings.

Obviously, such a unit has to be mounted on a frame or chassis so that it is firm and as free as possible from distortion strains that would tend to fracture or weaken the core tubes or break the bonds thereof to the tanks. To this end, whatever supporting frame is provided has to be connected to the tanks. These tanks, therefore, have to be made strong and rigid so as to withstand the strains incident to very hard usage, which is particularly severe in automotive equipment.

Heretofore, one of the most vulnerable points of the radiator construction has been the connections on the tanks for the attachment of the coolant conduits leading to and from the engine jacket. The practice, heretofore, followed has been to bond to the tanks a short tubular part, such as might be designated a "nipple," and to which the conduit could be attached. Certain manufacturers have cast these nipple connections and subsequently sought to bond them to the headers, usually by solder. Other manufacturers have formed these nipple couplings from tubing and bonded them to the tanks. In either case the bonding was generally only to one wall of the tank, the one through which the coupling was inserted. By reason of this latter fact, and the additional fact that close joints for the use of solder were not always effected in these constructions, it has been difficult to protect these connections against breakage or fracture, with the consequent leakage and repair or replacement.

In either type of these former connections, it has been found that the conduits have exerted a leverage on the nipple couplings due either to the movement of a vehicle over rough roads, or, particularly in stationary installations due to the missing of one cylinder of the engine with consequent creation of vibration following the loss of rhythm. Nipple couplings that have been bonded to but one wall of the tanks often prove incapable of long withstanding these kinds of strains. Breakage with leaks and repairs often accompanied with severely extended delays and excessive costs, often result.

Moreover, the securing of the tanks to the core has to be effected by bonding the tank to a header plate previously bonded to the core. This is usually done by forming interfitting flanges around the perimeters of the header plates and the tanks and applying solder to bond the two parts together. For solder bonding induction equipment is presently used to a very large extent. It having been practically imperative, with these prior structures, to first bond the nipple coupling to the tank the use of induction welding equipment has been found difficult where it has not proven impractical.

The main objects of this invention, therefore, are to provide an improved form and method of producing a heat exchange radiator; an improved form of nipple coupling for heat exchange radiators; an improved form and method of producing and subsequently bonding to a radiator tank an improved form of nipple coupling for the attachment of a conduit to said radiator for the conveying of coolant; and an improved form and method of attachment for radiator nipple couplings of this kind which is economical to manufacture and which results in a nipple connection that is practically as strong and as rigid as the tank itself.

In the accompanying drawings:

Fig. 1 is a perspective view of a heat exchange radiator constructed in accordance with this invention;

Fig. 2 is an enlarged, front elevation of the left side of the radiator shown in Fig. 1;

Fig. 3 is an enlarged, sectional detail of the nipple coupling, constructed in accordance with this invention and bonded to the radiator tank. The section being taken on the line 3—3 of Fig. 2;

Fig. 4 is a similar view taken on the line 4—4 of Fig. 2;

Fig. 5 is an enlarged, fragmentary sectional view of bonding of the nipple coupling to the radiator tank, the solder film being shown somewhat exaggeratedly;

Fig. 6 is a view showing the manner in which the nipple coupling is formed from a sheet metal tubing, the finished coupling being shown in full outline, the tubing in dotted outline;

Fig. 7 is a plan view of the coupling as shown in Fig. 6;

Fig. 8 is an end view of the same;

Fig. 9 is a view similar to Fig. 7 but showing a slightly modified form of the coupling;

Fig. 10 is a plan view of the finished coupling shown in Fig. 9; and

Fig. 11 is an end view of the same.

The essential concept of this invention involves so forming a tubular element that it may be push fitted into an opening in one of the spaced parallel walls of a tank for a heat exchange radiator and span the distance between said walls and be bonded to both with a peripheral opening in the element registering with the space between said tank walls, thereby providing a very rigidly-mounted coupling for the attachment of a coolant conduit.

A particular form of heat exchange radiator, wherein this invention is embodied, shown in the accompanying drawings, comprises a core unit 12 supported on header plates 13 and 14 to which are bonded header tanks 15 and 16 whereto these improved nipple couplings elements 17 and 18 are respectively attached and whereto also are secured the mounting brackets 19.

The core unit 12 is of standard construction, embodying a plurality of thin metal tubes mounting fins and bonded at their ends to the header plates 13 and 14.

The header plates 13 and 14 and the tanks 15 and 16, as herein shown, are thin wall metal stampings. They are formed with interfitting perimetrical flanges 20 and 21 respectively (see Fig. 4) whereby the plates 13 and 14 are bonded to the tanks 15 and 16 respectively. As noted in Fig. 1, the tanks 15 and 16 are formed with depressed portions 22 which serve to enhance the sturdiness of these parts and, incidently, contribute to their attractive appearance. Each tank is formed with a bore or opening 23 in one wall, bordered with an inwardly-extending flange 24, and a seat in the form of an annular embossment 25 in the other wall opposite the flanged bore 23. The embossment 25 is eccentrically disposed with respect to the axis of the bore 23, as most clearly shown in Figs. 2 and 3, and is provided with an aperture 26.

The bore or opening 23 in the tank 15 is circular; in the tank 16 it is elongated (see Fig. 2). These are so formed to respectively accommodate the annular and elongated cross sectional form of elements 17 and 18.

The bonding of the tanks 15 and 16 to the respective header plates 13 and 14 is undertaken when the gap 27 (see Fig. 4) between the interfitting flanges 20 and 21 faces upward. In this gap is faced a solder rod. The most facile way of effecting this bond is with the thusly assembled parts placed in an induction heating equipment.

The brackets 19 may be made of almost any design. Extensions 28 permit the brackets to be attached to the respective tanks 15 and 16, and apertured flanges 29 permit them to be attached to a support frame or chassis (not shown).

As most clearly shown in Figs. 6 and 9, the nipple coupling elements 17 and 18 are sections severed from sheet metal tubing 30. The tube 30 is of a diameter that, for element 17, will push fit readily into the flange 24 for the bore 23 in the tank 15. The severing is on a bias 31 of approximately 30 degrees to the longitudinal axis of the tube, as most clearly shown in these figures. For all practical purposes the angle of the bias cut may be between 20 and 40 degrees. Subsequently one end of the severed section, which is to be the portion exposed outside of the tank, is formed with a bead 32. The other biasly-cut end, which is to be the portion disposed between the walls of the tank, is bent transversely to form a radially-disposed flange 33 at a distance from the opposite end of the bias cut which forms the peripheral opening less than the distance between the tank walls. In this flange 33 is formed an embossment 34 eccentrical to the longitudinal axis of the element. Such an embossment may be formed with the die effecting the bend or subsequent thereto. This bias cut 31 is located inwardly from the beaded end 32 so as to constitute the oblique opening extending from the tubular portion of the element to the flange or end wall 33 at a point adjacent the longitudinal axis of the element. Thus when the elements 17 and 18 are pushed into the respective bores or openings 23 the oblique opening portion will span the distance between the opposite parallel walls of the tank with the embossment 34 in the flange 33 abutting the embossment 25 in the wall so that the oblique opening 35—formed by the bias cut—will be in appropriate registration with the space between the tank walls.

With certain types of radiators of this kind the lower tank 16 is not as deep as the tank 15. Therefore, in order to have an opening 23 equal in cross sectional area to that of the opening 23 in the deeper tank it is necessary to make that opening or bore 23 of elongated form. Under such circumstances the element 18 is compressed so as to convert it to an elongated cross sectional form, as clearly shown in the drawings.

Because the embossments 25 and 34 are eccentrically arranged with respect to the axis of the bore 23 for the upper tank 15, the face of the wall, wherein the bore 23 is formed, and the periphery of the coupling element 17 are scored as indicated at 37 and 38 (see Figs. 2 and 7). When these scorings are in registration the embossments 25 and 34 are certain to be nested properly to secure the best bonding.

This form and arrangement of nipple couplings, bonded to opposite parallel walls of the respective tanks not only makes for greater rigidity and practically an unbreakable bond, but makes more facile and consequently less costly the method of bonding the tanks 15 and 16 to the header plates 13 and 14 than has been possible with constructions heretofore provided.

In these former constructions it has been practically imperative to bond the coupling to the tank before the tank was bonded to the header plate. Consequently, the protruding coupling on the tank made it very difficult to arrange the induction bonding equipment sufficiently adjacent the interfitting flanges 21 and 29 of the tank and plate to apply the heat as contiguously as was desired to the solder filled gap 27.

However, this improved form of nipple coupling makes possible an improved method of assembling the several radiator parts so as to most effectively locate the induction welding equipment for bonding the tanks and header plates.

After forming the nipple couplings 17 and 18, by the method as hereinbefore explained and bonding the header plates 13 and 14 to the core unit 12 in the customary manner, the tanks 15 and 16 are successively bonded to the header plates 13 and 14, before the nipple couplings 17 and 18 are bonded to the respective tanks. To this end the core unit 12, with a tank in place on its header plate and with the gap 27 between the interfitting flanges 20 and 21 supporting a solder rod is placed in the induction welding equipment and located directly contiguous to the interfitting flanges 20 and 21. Such a close placement of the equipment to the area of welding is made possible because there is no protruding nipple coupling, as has been the case heretofore.

After the bonding of the two tanks 15 and 16 to their respective header plates 13 and 14 has been effected, the elements 17 and 18 are inserted into the respective bores 23 with the embossments 34 nested in the apertured embossments 25. In the usual manner solder is then applied around the juncture of the elements 17 and 18 and the flanged openings 23 and through the apertures 26 to the abutting faces of the embossments 25 and 34. At all of these points the close fitting contact of these elements 17 and 18 with the walls of the tanks 15 and 16 cause capillary action to draw a film of solder 36 in between the entire area of contact of the respective parts, as is somewhat exaggeratedly illustrated in Fig. 5.

In constructions embodying this invention, the usual strains to which these couplings are subjected, as previously pointed out herein, are absorbed by both walls of the tank, instead of one wall as heretofore. Accordingly the danger of breaks causing leaks or requiring repair is reduced to a nullity. Certainly it would take something more than the heretofore known strains to fracture the bonds of the couplings 17 and 18 to either of the walls of the respective tanks 17 and 18.

Although this form of coupling element and the method of producing the same and bonding it to the tank has been shown herein as applied to a radiator standard for automotive equipment, it will be understood that the invention is equally applicable to radiators for other types of equipment. In fact, it is applicable for use in any construction where there is a desire for a more secure bonding of a nipple connection to a tank, which nipple is to have attached thereto a conduit through which excessive strains are likely to be communicated to the coupling.

Variations and modifications in the details of structure and arrangement of the parts may be resorted to within the spirit and coverage of the appended claims.

I claim:

1. The method of forming a thin-wall nipple-coupling for use with thin-wall radiator-tanks which comprises, cutting a tubular element on a bias at an angle of between 20 and 40 degrees to its longitudinal axis to form an angularly-disposed opening, bending the end of the element formed by the bias cut to constitute a transversely-disposed flange spaced from the opposite end of the angularly-disposed opening a distance less than that between the opposite tank walls, and then forming in the tube-end flange an embossment eccentric to the longitudinal axis of the finished nipple adapted for nesting with a comparable embossment on the tank wall to predispose the positioning of the coupling in the tank to locate the tube opening in proper communication with the tank.

2. A thin-wall, radiator-tank, nipple-coupling in the form of a tubular element of uniform cross section for a portion of its length having an opening in one side of the remaining portion of its length, and an end wall extending transversely of the element, the opening extending obliquely from one end of the tubular portion to the end wall at a point adjacent the longitudinal axis of the tubular portion, the area of the oblique opening being at least as large as the cross sectional area of the tubular portion.

3. A thin-wall, radiator-tank, nipple-coupling in the form of a tubular element of uniform cross section for a portion of its length having an opening in one side of the remaining portion of its length, an end wall extending transversely of the element, the opening extending obliquely from one end of the tubular portion to the end wall at a point adjacent the longitudinal axis of the tubular portion, the area of the oblique opening being at least as large as the cross sectional area of the tubular portion, and an embossment in the wall eccentrically of the longitudinal axis of the element.

4. A thin-wall radiator tank having a bore in one wall thereof, a thin-wall, nipple-coupling in the form of a tubular element of uniform cross section for a portion of its length inserted in the tank wall bore, the element having an opening in one side of the remaining portion, an end wall extending transversely of the element, the opening extending obliquely from one end of the tubular portion to the end wall at a point adjacent the longitudinal axis of the tubular portion, the area of the oblique opening being at least as large as the cross sectional area of the tubular portion, and nesting embossments on the oposite tank wall and the element end-wall respectively eccentric of the longitudinal axis of the tubular portion solder bonded to each other.

References Cited in the file of this patent

UNITED STATES PATENTS

| Number | Name | Date |
|---|---|---|
| 164,757 | North | June 22, 1875 |
| 621,693 | Morris | Mar. 21, 1899 |
| 720,989 | Williams | Feb. 17, 1903 |
| 861,423 | Ayers | July 30, 1907 |
| 973,802 | Merrill | Oct. 25, 1910 |
| 1,699,541 | Murray | Jan. 22, 1929 |
| 1,707,172 | Nathanson | Mar. 26, 1929 |
| 1,918,715 | Robinson | July 18, 1933 |
| 1,925,847 | Prentice | Sept. 5, 1933 |
| 2,028,456 | Karmazin | Jan. 21, 1936 |
| 2,147,431 | Ewing | Feb. 14, 1939 |
| 2,184,658 | Young | Dec. 26, 1939 |
| 2,275,107 | Holmes | Mar. 3, 1942 |
| 2,435,697 | Powers | Dec. 10, 1948 |

FOREIGN PATENTS

| Number | Country | Date |
|---|---|---|
| 10,708 of 1901 | Great Britain | Mar. 20, 1902 |
| 194,734 | Great Britain | Mar. 22, 1923 |